(12) United States Patent
Fang

(10) Patent No.: US 11,365,778 B2
(45) Date of Patent: Jun. 21, 2022

(54) ROTARY DEVICE

(71) Applicant: PEGATRON CORPORATION, Taipei (TW)

(72) Inventor: Chao-Yu Fang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 741 days.

(21) Appl. No.: 16/369,145

(22) Filed: Mar. 29, 2019

(65) Prior Publication Data
US 2019/0368564 A1  Dec. 5, 2019

(30) Foreign Application Priority Data

Jun. 1, 2018 (TW) .................................. 107119080

(51) Int. Cl.
*F16D 71/04* (2006.01)
*F16D 63/00* (2006.01)
(Continued)

(52) U.S. Cl.
CPC ............... *F16D 71/04* (2013.01); *F16D 3/10* (2013.01); *F16D 11/06* (2013.01); *F16D 41/04* (2013.01);
(Continued)

(58) Field of Classification Search
CPC .......... F16D 71/04; F16D 3/10; F16D 63/006; F16D 65/14; H01H 3/52; H01H 19/18; H03J 5/22
See application file for complete search history.

(56) References Cited

U.S. PATENT DOCUMENTS 2,780,941 A * 2/1957 Kollmorgen ............. G05G 5/04
338/334
3,012,447 A * 12/1961 Wallace ................... G05G 5/04
192/139
(Continued)

FOREIGN PATENT DOCUMENTS

CN 202254850 U 5/2012
CN 105443942 B 3/2016
(Continued)

OTHER PUBLICATIONS

Office Action issued on Taiwan Patent Application No. 107119080 dated Jan. 19, 2019.

*Primary Examiner* — Daniel D Yabut
(74) *Attorney, Agent, or Firm* — McClure, Qualey & Rodack, LLP

(57) ABSTRACT

A rotary device includes a rotatable member and a limiting member. The rotatable member includes a positioning mechanism, the positioning mechanism includes a stopping member and a positioning member. When the rotatable member rotates along a first rotation direction to make the limiting member abut against the positioning member, the positioning member is pushed by the limiting member to move away from the stopping portion and rotate relative to the stopping member, so that the positioning member to passes through the limiting member. When the rotatable member rotates along a second rotation direction opposite to the first rotation direction to make the limiting member abut against the positioning member, the positioning member is pushed by the limiting member to move close to the stopping portion, so that the positioning member is stopped between the limiting member and the stopping portion, to position the rotatable member.

17 Claims, 17 Drawing Sheets

(51) Int. Cl.
  *F16D 65/14* (2006.01)
  *F16D 3/10* (2006.01)
  *F16D 41/04* (2006.01)
  *F16D 43/26* (2006.01)
  *F16D 11/06* (2006.01)

(52) U.S. Cl.
  CPC ........... *F16D 43/26* (2013.01); *F16D 63/006* (2013.01); *F16D 65/14* (2013.01)

(56) References Cited

U.S. PATENT DOCUMENTS

| | | | | |
|---|---|---|---|---|
| 3,147,629 | A | * | 9/1964 | Michalec ................ G05G 5/04 192/139 |
| 3,662,610 | A | * | 5/1972 | Thoen ..................... G05G 5/04 74/10.2 |
| 4,794,814 | A | * | 1/1989 | Ferguson, Jr. ........... G05G 5/04 74/526 |
| 2009/0301238 | A1 | * | 12/2009 | Wintsch ................. F16H 35/00 74/89.17 |
| 2015/0316200 | A1 | * | 11/2015 | Hoshi ..................... F21V 21/15 248/289.11 |
| 2016/0201775 | A1 | * | 7/2016 | Gitnes ................. F16H 25/2015 74/89.37 |

FOREIGN PATENT DOCUMENTS

| | | | |
|---|---|---|---|
| CN | 206363699 U | | 7/2017 |
| CN | 206853131 U | | 1/2018 |
| CN | 207164629 U | * | 3/2018 |
| JP | 2006202072 A | | 8/2006 |
| TW | M299422 | | 10/2006 |

\* cited by examiner

ROTARY DEVICE

CROSS-REFERENCE TO RELATED APPLICATION

This non-provisional application claims priority under 35 U.S.C. § 119(a) to Patent Application No. 107119080 filed in Taiwan, R.O.C. on Jun. 1, 2018, the entire contents of which are hereby incorporated by reference.

BACKGROUND

Technical Field

The application generally relates to a rotary device. Specifically, the application relates to a rotary device having a limiting function.

Related Art

As use habits are diversified, current instruments or devices usually need reliable large-angle rotation control. However, limited by a structural design, an existing rotary device can usually achieve effective control only when a forward and reverse rotation angle is less than 180 degrees. When the rotary device intends to achieve angle control when the forward and reverse rotation angle is greater than 180 degrees, because the forward and reverse rotation has a corresponding overlapping location, the rotary device needs a more complex stopping mechanism, and mechanism interference is usually caused. Consequently, it is difficult to implement the angle control.

SUMMARY

An objective of the application is to provide a rotary device, which has a one-way limiting function, and can freely rotate reversely.

In an embodiment, a rotary device of the application includes a rotatable member and a limiting member, where the rotatable member is rotatably disposed on a base, the rotatable member includes a positioning mechanism, the positioning mechanism includes a stopping member and a positioning member, the stopping member includes a rotating shaft and a stopping portion, the positioning member is rotatably sleeved over the rotating shaft, and one side of the positioning member corresponds to the stopping portion; and the limiting member is fixed on the base, where the limiting member is configured to selectively stop the positioning member according to a rotation direction of the rotatable member; when the rotatable member rotates along a first rotation direction to make the limiting member abut against the positioning member, the positioning member is pushed by the limiting member to move away from the stopping portion and rotate relative to the stopping member, so that the positioning member passes through the limiting member; when the rotatable member rotates along a second rotation direction opposite to the first rotation direction to make the limiting member abut against the positioning member, the positioning member is pushed by the limiting member to move close to the stopping portion, so that the positioning member is stopped between the limiting member and the stopping portion, to position the rotatable member.

In an embodiment, the rotatable member includes a rotation body, the positioning mechanism further includes a supporting member, the supporting member is disposed on the rotation body and is connected to the stopping member, and the rotating shaft extends along a radial direction of the rotation body and is protruded from the supporting member.

In an embodiment, the positioning member includes a plate body portion and a shaft hole portion, the plate body portion is protruded from the shaft hole portion, the shaft hole portion is sleeved over the rotating shaft, and a part of the plate body portion corresponds to the stopping portion.

In an embodiment, the positioning member further includes a protruding rib, the protruding rib is disposed on the plate body portion, and the protruding rib is configured to separate an area corresponding to the stopping portion of the plate body portion from an area that does not correspond to the stopping portion of the plate body portion.

In an embodiment, the rotary device of the application further includes a movable ring and a blocking member, where the movable ring and the blocking member are disposed coaxial with the rotatable member, the rotatable member is connected to the movable ring and drives the movable ring to rotate, the blocking member is fixed on the base and is located on a rotation path of the movable ring, and when the movable ring rotates along the rotation path and abuts against the blocking member, the blocking member is configured to block the movable ring, to position the rotatable member In an embodiment, the rotatable member further includes a shaft body portion and a protruding portion, the positioning mechanism and the protruding portion are disposed along an axial direction of the shaft body portion, and the protruding portion is located on the rotation path of the movable ring; the movable ring has a convex block, the convex block is disposed in a protruding manner along a part of a circumference of the movable ring; and when the rotatable member rotates, the protruding portion pushes the convex block of the movable ring, so that the movable ring rotates along the rotation path, until the protruding portion and the blocking member respectively abut against two opposite ends of the convex block.

In an embodiment, the limiting member includes a switching unit, when the rotatable member rotates along the second rotation direction opposite to the first rotation direction to make the limiting member abut against the positioning member, the switching unit is triggered.

Another objective of the application is to provide a rotary device, which has a two-way limiting function, and rotation angles of the directions may be greater than 180 degrees.

In another embodiment, a rotary device of the application includes a rotatable member and a limiting mechanism, where the rotatable member is rotatably disposed on a base, the rotatable member includes a first positioning mechanism and a second positioning mechanism, the first positioning mechanism includes a first stopping member and a first positioning member, the second positioning mechanism includes a second stopping member and a second positioning member, each of the first stopping member and the second stopping member includes a rotating shaft and a stopping portion, the first positioning member and the second positioning member are respectively rotatably sleeved over the rotating shafts, and the stopping portions are separately correspondingly disposed on one side of the first positioning member and the second positioning member; and the limiting mechanism is fixed on the base, where the limiting mechanism is configured to selectively stop the first positioning member or the second positioning member according to a rotation direction of the rotatable member, when the rotatable member rotates along a first rotation direction, the limiting mechanism allows the first positioning mechanism to pass through and the second positioning member is stopped between the limiting mechanism and the stopping portion of the second stopping member, to position the rotatable member; and when the rotatable member rotates along a second rotation direction opposite to the first rotation direction, the limiting mechanism allows the second positioning mechanism to pass through and the first positioning member is stopped between the limiting mechanism and the stopping portion of the first stopping member, to position the rotatable member.

In an embodiment, the first positioning member is rotatably sleeved over the rotating shaft of the first stopping member, the stopping portion of the first stopping member is correspondingly disposed on the side of the first positioning member, and when the rotatable member rotates along the first rotation direction, the limiting mechanism allows the first positioning mechanism to pass through, so that the first positioning member is pushed by the limiting mechanism to move away from the stopping portion of the first stopping member and rotate along a first direction relative to the first stopping member, so that the first positioning member passes through the limiting mechanism; and the second positioning member is rotatably sleeved over the rotating shaft of the second stopping member, the stopping portion of the second stopping member is correspondingly disposed on the side of the second positioning member, when the rotatable member rotates along the second rotation direction, the limiting mechanism allows the second positioning mechanism to pass through, so that the second positioning member is pushed by the limiting mechanism to move away from the stopping portion of the second stopping member and rotate along a second direction relative to the second stopping member, and the first direction is opposite to the second direction.

In an embodiment, the limiting mechanism includes a first limiting member and a second limiting member, the rotatable member includes a shaft body portion; the first positioning mechanism and the second positioning mechanism are disposed along an axial direction of the shaft body portion; and the first limiting member corresponds to the first positioning mechanism, to stop the first positioning mechanism and allow the second positioning mechanism to pass through, and the second limiting member corresponds to the second positioning mechanism, to stop the second positioning mechanism and allow the first positioning mechanism to pass through.

In an embodiment, the first limiting member includes a first switching unit, and the second limiting member includes a second switching unit; when the rotatable member rotates along the second rotation direction to make the first limiting member abut against the first positioning member, the first switching unit is triggered; and when the rotatable member rotates along the first rotation direction to make the second limiting member abut against the second positioning member, the second switching unit is triggered.

In an embodiment, each of the first positioning mechanism and the second positioning mechanism further includes a supporting member, the supporting members are disposed on a gear portion and are respectively connected to the first stopping member and the second stopping member, each of the first stopping member and the second stopping member includes a rotating shaft and a stopping portion, the first positioning member and the second positioning member are respectively rotatably sleeved over the rotating shafts, the stopping portions are separately correspondingly disposed on the side of the first positioning member and the second positioning member, and the rotating shafts are respectively protruded from the supporting members.

In an embodiment, each of the first positioning member and the second positioning member includes a plate body portion and a shaft hole portion, the plate body portion is protruded from the shaft hole portion, the shaft hole portion is sleeved over the rotating shaft, a part of the plate body portion corresponds to the corresponding stopping portion, and the shaft hole portion is connected to the plate body portion and is sleeved over the corresponding rotating shaft.

In an embodiment, at least one of the first positioning member and the second positioning member further includes a protruding rib, the protruding rib is disposed on the plate body portion, and the protruding rib is configured to separate an area corresponding to the first stopping portion or the second stopping portion of the plate body portion from an area that does not correspond to the first stopping portion or the second stopping portion of the plate body portion.

In an embodiment, the rotary device of the application further includes a driving gear, where the driving gear receives a power to rotate, the rotatable member includes a gear portion, the gear portion is engaged with the driving gear, and the driving gear drives the rotatable member to rotate.

Compared with existing technologies, according to the rotary device of the application, in cooperation with the positioning member and the stopping portion of the positioning mechanism, the limiting member provides a selective stopping function according to different rotation directions of the rotatable member, so that one-way positioning can be effectively achieved, and reverse free rotation can be achieved. Further, by using the limiting mechanism in cooperation with two one-way positioning mechanisms, the rotary device of the application not only can provide a selective stopping function according to different rotation directions of the rotatable member, but also can effectively achieve two-way positioning of greater than 180 degrees.

DETAILED DESCRIPTION OF THE EMBODIMENTS

The application provides a rotary device, and in particular, a rotary device that can achieve large-angle limitation by means of cooperation between a limiting member and a positioning mechanism. Specifically, the rotary device of the application may be applied to any device that needs one-way limitation or two-way limitation, for example, a display device. However, the application is not limited thereto. Hereinafter, details of the rotary device of embodiments of the application are described with reference to the drawings.

Figure 1:
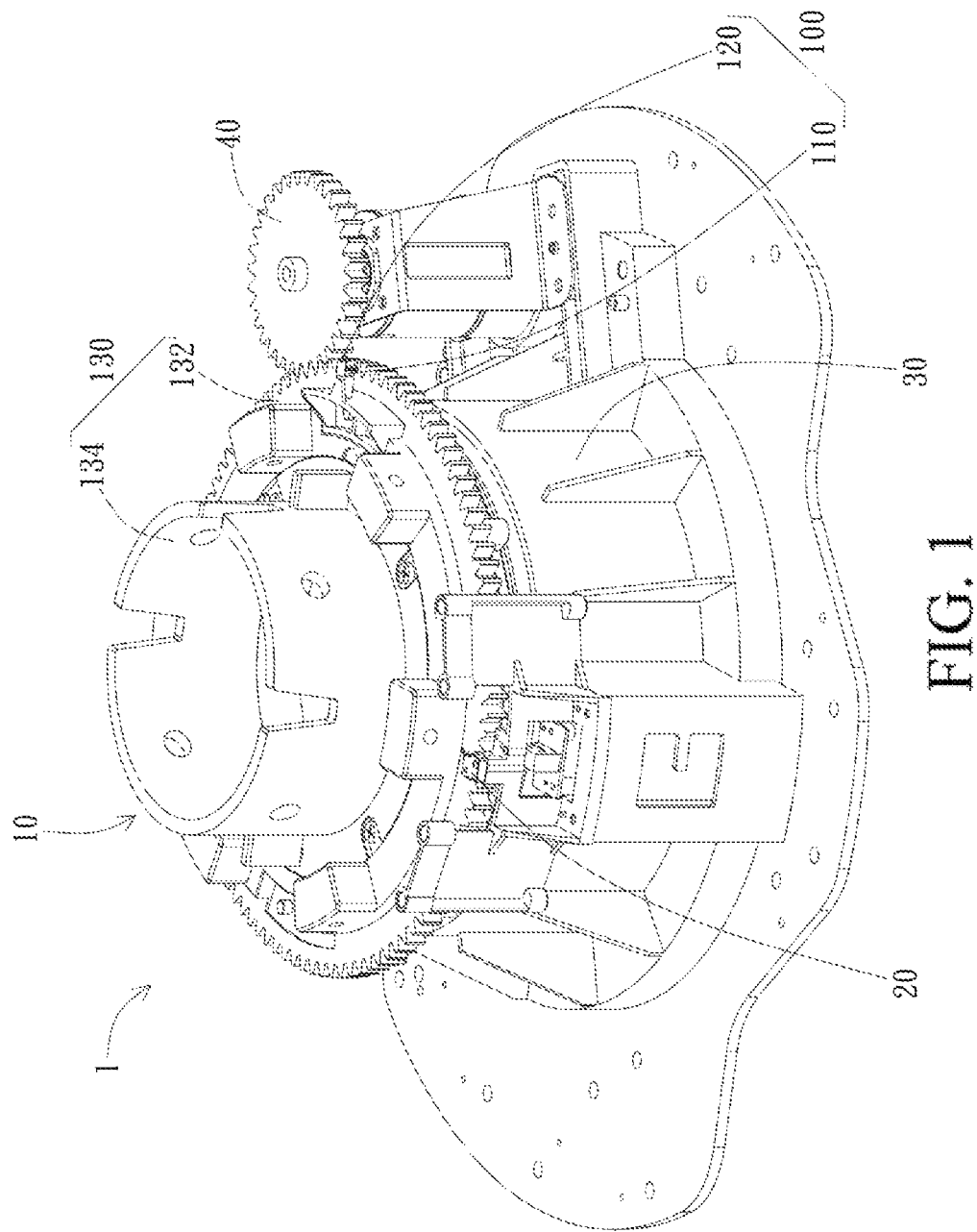
FIG. 1 is a schematic diagram of a rotary device according to an embodiment of the application.
Figure 6:
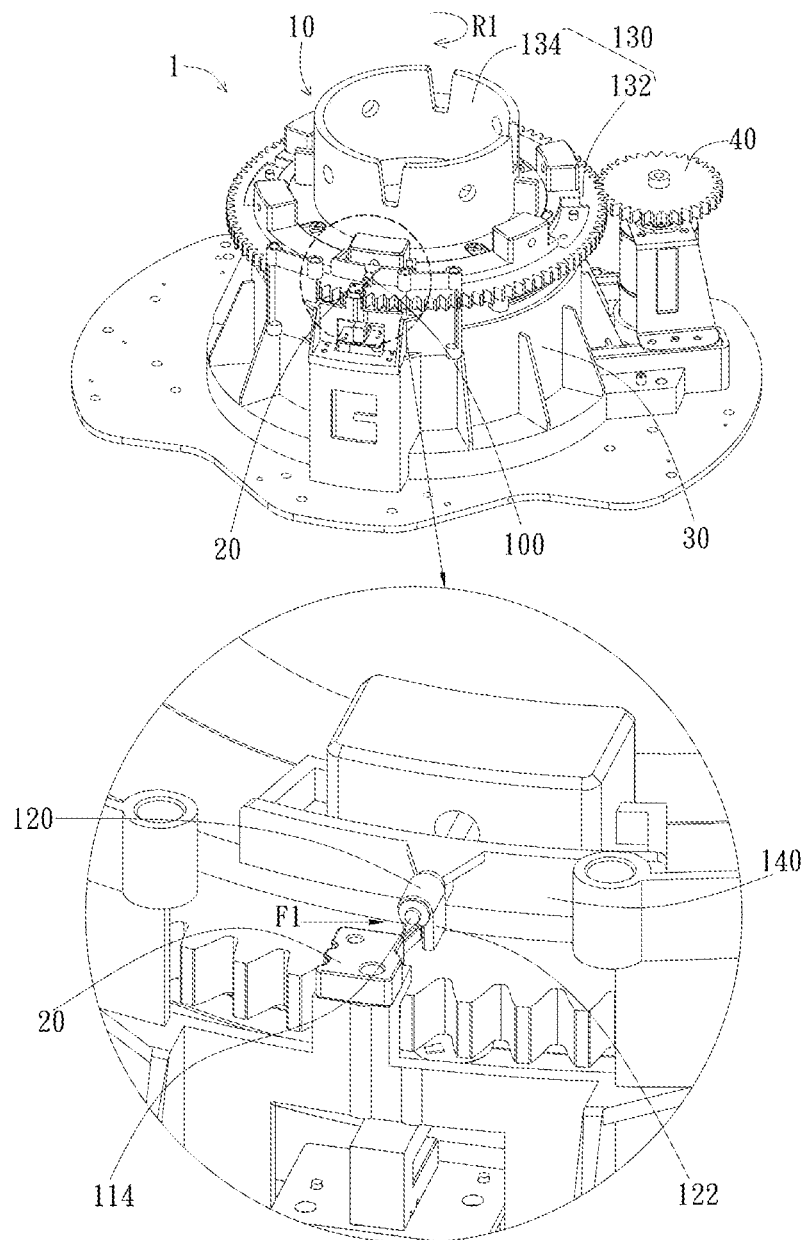
FIG. 6 is a schematic diagram of 90-degree rotation of a rotatable member of a rotary device along a first direction according to an embodiment of the application.
Figure 7:
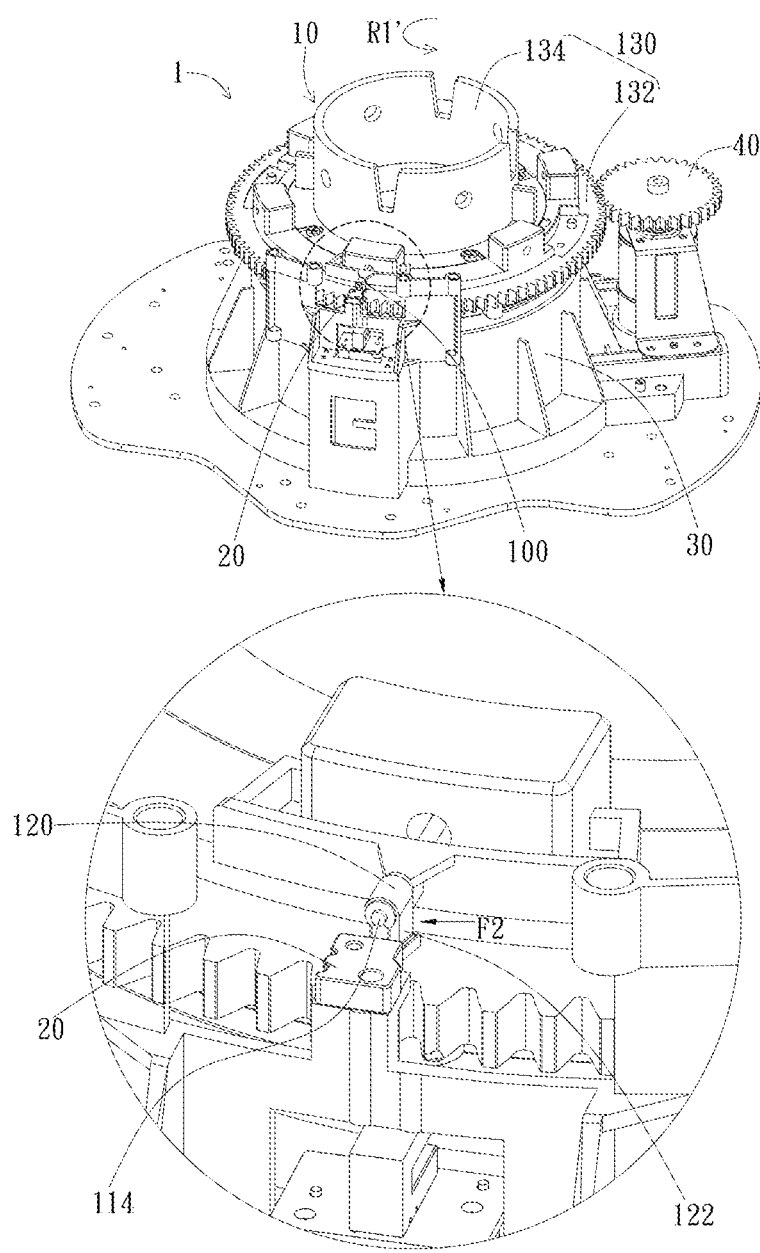
FIG. 7 is a schematic diagram of 270-degree rotation of a rotatable member of a rotary device along a second direction according to an embodiment of the application.

As shown in FIG. 1, in an embodiment, a rotary device 1 of the application includes a rotatable member 10 and a limiting member 20. The rotary device 10 may further include a base 30, configured to support the rotatable member 10 to rotate. The rotatable member 10 is rotatably disposed on the base 30, and the rotatable member 10 has a positioning mechanism 100. The positioning mechanism 100 includes a stopping member 110 and a positioning member 120. The stopping member 110 includes a rotating shaft 114 and a stopping portion 112. The stopping portion 112 is protruded from the rotating shaft 114. The positioning member 120 is rotatably sleeved over the rotating shaft 114. The stopping portion 112 is correspondingly disposed on one side of the positioning member 120. In this embodiment, the positioning member 120 is rotatably sleeved over the rotating shaft 114, and the stopping portion 112 is disposed on one side of the positioning member 120 in an overlapping manner. The limiting member 20 is fixed on the base 30, and the limiting member 20 is configured to selectively stop the positioning member 120 according to a rotation direction of the rotatable member 10. Specifically, when the rotatable member 10 rotates along a first rotation direction R1 to make the limiting member 20 abut against the positioning member 120 (as shown in FIG. 6), the positioning member 120 is pushed by the limiting member 20 to move away from the stopping portion 112 and rotate relative to the stopping member 110, so that the positioning member 120 passes through the limiting member 20; when the rotatable member 10 rotates along a second rotation direction R1' opposite to the first rotation direction R1 to make the limiting member 20 abut against the positioning member 120 (as shown in FIG. 7), the positioning member 120 is pushed by the limiting member 20 to move close to the stopping portion 112, so that the positioning member 120 is stopped between the limiting member 20 and the stopping portion 110, to position the rotatable member 10.

Specifically, the limiting member 20 is preferably disposed adjacent to a side edge of the rotatable member 10, to be located on an acting path of the positioning mechanism 100. In an embodiment, the limiting member 20 may be implemented as a switching assembly (for example, a limit switch), so that the limiting member 20 stops the positioning member 120 and a switching unit (not shown) is triggered. However, the application is not limited thereto. In another embodiment, the limiting member 20 may be implemented as a stopping rod protruding toward the rotatable member 10, to stop the positioning member 120. Specifically, the rotatable member 10 includes a rotation body 130, and the positioning mechanism 100 is disposed on the rotation body 130, and rotates with the rotation body 130 relative to the base 30. When the rotation body 130 rotates to drive the positioning mechanism 100 to move toward the limiting member 20, the limiting member 20 may selectively allow the positioning mechanism 100 to pass through, to allow the rotation body 130 to continue to rotate, or block the positioning mechanism 100 to limit rotation of the rotation body 130, to achieve positioning.

In this embodiment, the rotary device 1 preferably may further include a driving gear 40, configured to receive a power to rotate, thereby driving the rotatable member 10 to rotate. For example, the rotation body 130 includes a gear portion 132, and the gear portion 132 is engaged with the driving gear 40, so that the driving gear 40 receives power provided by, for example, a motor, to rotate, and drives the gear portion 132 to rotate, thereby driving the rotatable member 10 to rotate. However, the application is not limited thereto. In other embodiments, according to actual application, the rotatable member 10 may receive driving of a driving device (for example, a motor) to rotate, and does not need to be driven by the driving gear 40, or the rotatable member 10 may rotate by using an external force applied by a user, and a driving device does not need to be disposed. In other words, the rotatable member 10 may be implemented as any suitable rotation assembly, and may rotate by using an external force applied by a user, or rotate by using power provided by another power device.

Figure 2:
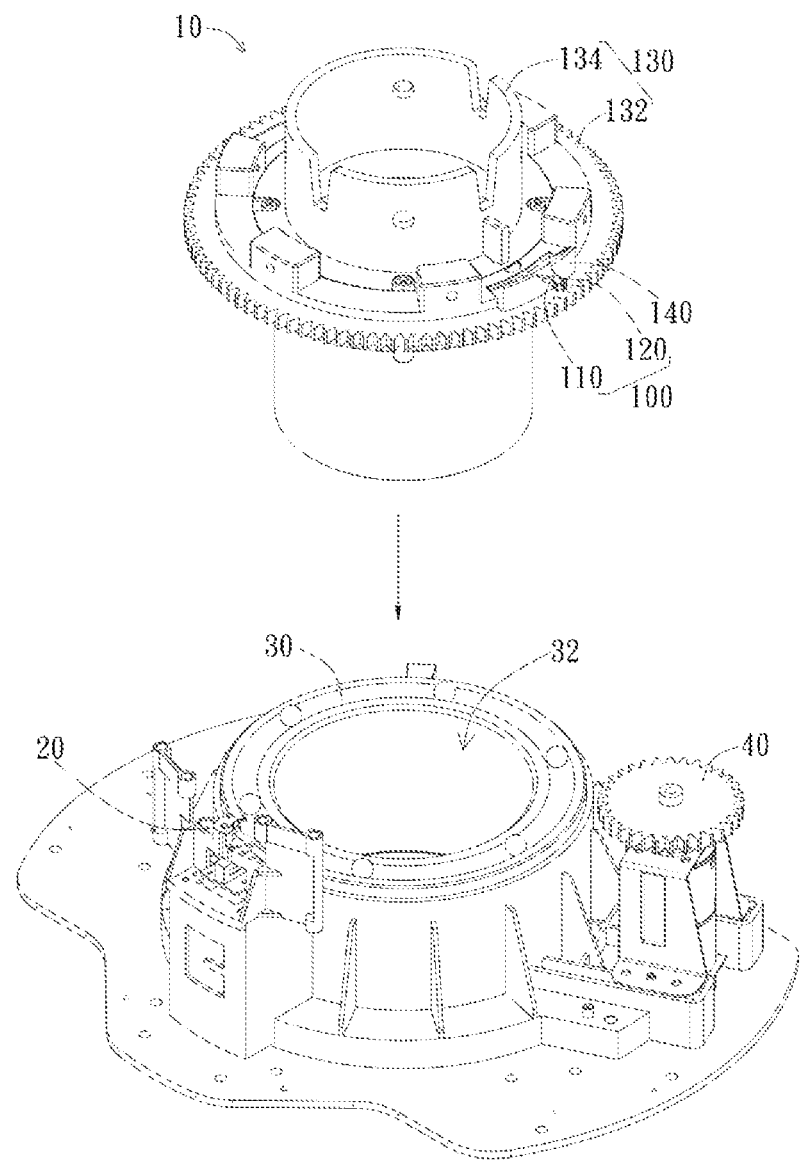
FIG. 2 is a partial schematic exploded view of a rotary device according to an embodiment of the application.

As shown in FIG. 2, in an embodiment, the limiting member 20 and the driving gear 40 are preferably disposed on the base 30 corresponding to the rotatable member 10. However, the application is not limited thereto. In other embodiments, according to actual application, the limiting member 20 and the driving gear 40 may be disposed independent of the base 30. In this embodiment, the base 30 preferably has an accommodating slot 32, and the rotation body 130 is partially inserted into the accommodating slot 32 and can rotate in the accommodating slot 32 relative to the base 30. For example, the rotation body 130 may preferably include a gear portion 132 and a shaft body portion 134, and the gear portion 132 is disposed coaxial with the shaft body portion 134, so that the shaft body portion 134 is rotatably inserted into the accommodating slot 32, and the gear portion 132 may rotate together with the shaft body portion 134 relative to the base 30. However, the application is not limited thereto. In other embodiments (not drawn), the shaft body portion 134 may be integrated on the base 30, and the rotation body 130 is preferably an annular gear portion 132, so that the gear portion 132 is rotatably sleeved over the shaft body portion of the base 30, and the gear portion 132 can rotate relative to the shaft body portion of the base 30.

Figure 3:
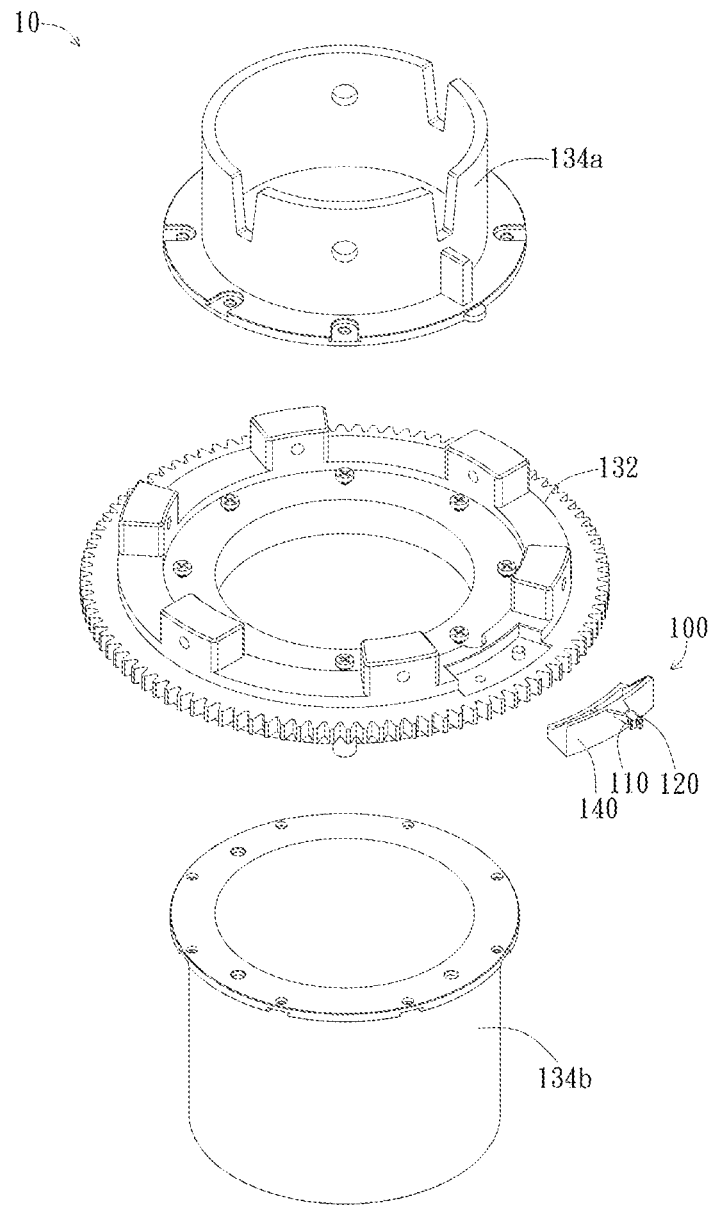
FIG. 3 is a partial schematic exploded view of a rotatable member according to an embodiment of the application.

As shown in FIG. 3, in an embodiment, the shaft body portion 134 includes an upper shaft body portion 134a and a lower shaft body portion 134b. Specifically, the upper shaft body portion 134a and the lower shaft body portion 134b are respectively disposed on an upper surface and a lower surface of the gear portion 132, to form the rotation body 130 shown in FIG. 2, and can be respectively configured to connect a device to be rotated (for example, a display device) and the base 30. However, the application is not limited thereto. In other embodiments, according to actual application, the upper shaft body portion 134a and the lower shaft body portion 134b may be integrated into a single shaft body portion, and the gear portion 132 may be connected to the shaft body portion 134 by means of locking, clamping, mold casting, and welding. Further, the positioning mechanism 100 is preferably disposed on the gear portion 132 of the rotation body 130.

Figure 4A:
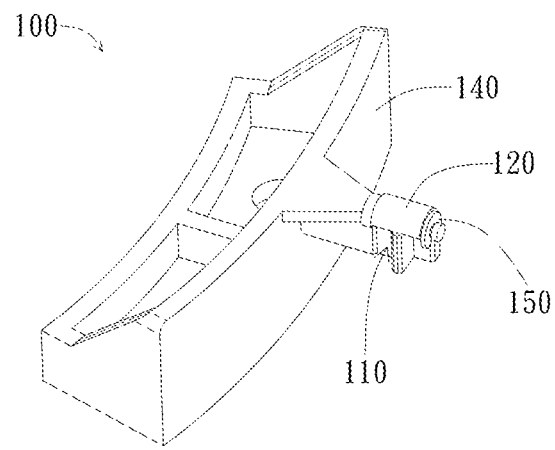
FIG. 4A and FIG. 4B are respectively schematic diagrams of assembly and disassembly of a positioning mechanism according to an embodiment of the application.
Figure 4B:
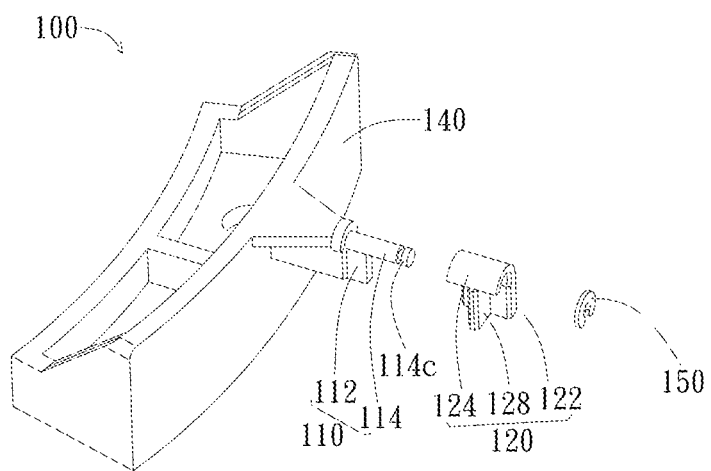

Specifically, referring to FIG. 4A and FIG. 4B in combination with FIG. 1, in an embodiment, the positioning mechanism 100 further includes a supporting member 140, and the supporting member 140 is disposed on the rotation body 130 and is connected to the stopping member 110. The rotating shaft 114 preferably extends along a radial direction of the rotation body 130 and is protruded from the supporting member 140, and the stopping portion 112 is located below the rotating shaft 114, to correspond to the positioning member 120 (for example, 122b in FIG. 5A). Specifically, the positioning mechanism 100 is fixed on the upper surface of the gear portion 132 by using the supporting member 140 by means of fixing, clamping, or the like, and is adjacent to an outer edge of the gear portion 132. The rotating shaft 114 extends toward a periphery of the gear portion 132 along the radial direction of the gear portion 132, so that the positioning member 120 is rotatably sleeved over the rotating shaft 114. The stopping portion 112 is a retaining wall disposed below the rotating shaft 114, so that the positioning member 120 partially overlaps the stopping portion 112 when sleeved over the rotating shaft 114. The positioning mechanism 100 further includes a clamping member 150, configured to prevent the positioning member 120 from detaching from the rotating shaft 114. In an embodiment, the clamping member 150 may be a C-shaped ring, and the rotating shaft 114 may be provided with a clamping slot 114c. After the positioning member 120 is sleeved over the rotating shaft 114, axial movement of the positioning member 120 along the rotation shaft 114 may be limited by means of clamping between the clamping member 150, namely, the C-shaped ring, and the clamping slot 114c, thereby avoiding detachment of the positioning member 120 from the rotating shaft 114.

Figure 5A:
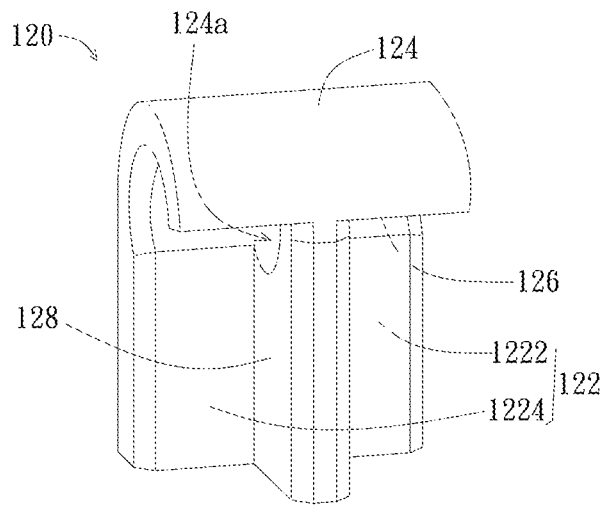
FIG. 5A and FIG. 5B are schematic three-dimensional and side views of a positioning member according to an embodiment of the application.
Figure 5B:
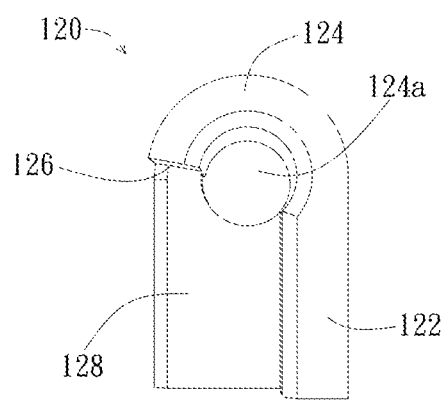

Referring to FIG. 5A and FIG. 5B in combination with FIG. 4B, in an embodiment, the positioning member 120 includes a plate body portion 122 and a shaft hole portion 124, and the plate body portion 122 is protruded from the shaft hole portion 124. The shaft hole portion 124 is configured to sleeve over the rotating shaft 114, and a part of the plate body portion 122 overlaps corresponding to the stopping portion 112. The shaft hole portion 124 has an inclined plane 126, and the inclined plane 126 is preferably inclined toward the stopping portion 110. The shaft hole portion 124 is provided with a shaft hole 124a, and a pore size of the shaft hole 124a is preferably slightly greater than a diameter of the rotating shaft 114, so that the positioning member 120 can rotate relative to the rotating shaft 114 by means of sleeving between the shaft hole 124a and the rotations shaft 114. The inclined plane 126 of the shaft hole portion 124 is preferably inclined downward from the outer edge of the shaft hole portion 124 toward the stopping portion 112, so that the positioning member 120 rotates relative to the rotating shaft 114 without clamping the stopping portion 112. Further, the positioning member 120 further includes a protruding rib 128, and the protruding rib 128 is disposed on the plate body portion 122, and is preferably located below the inclined plane 126. Specifically, the protruding rib 128 is preferably a rib sheet that protrudes outward from a plate surface of the plate body portion 122, to enhance the structural strength of the plate body portion 122. In this embodiment, the protruding rib 128 is located below the shaft hole portion 124 and one end of the protruding rib 128 is a side wall defining the shaft hole 124a. Further, the protruding rib 128 is configured to separate an area corresponding to the stopping portion 112 of the plate body portion 122 from an area that does not correspond to the stopping portion 112 of the plate body portion 122. For example, the protruding rib 128 separates the plate body portion 122 into a first plate body area 1222 and a second plate body area 1224. In this embodiment, the first plate body area 1222 is an area that is far away from the supporting member 140 and that does not overlap the stopping portion 112, and the second plate body area 1224 is an area that is adjacent to the supporting member 140 and that overlaps the stopping portion 112. However, the application is not limited thereto. According to a disposing direction of the positioning member 120 relative to the rotating shaft 114 (for example, a protruding direction of the protruding rib 128), the first plate body area 1222 may be an area overlapping the stopping portion 112, and the second plate body area 1224 may be an area that does not overlap the stopping portion 112.

Further, the stopping portion 112 is disposed on a rotation path of the plate body portion 122, to limit that the positioning member 120 can only perform one-way rotation relative to the stopping portion 112. As shown in FIG. 4A, relative to the plate body portion 122 of the positioning member 120, the stopping portion 112 is located on a left side of the plate body portion 122. To be specific, the stopping portion 112 is located on a clockwise rotation path of the plate body portion 122, so that the plate body portion 122 can only perform anticlockwise rotation relative to the rotating shaft 114.

Figure 6A:
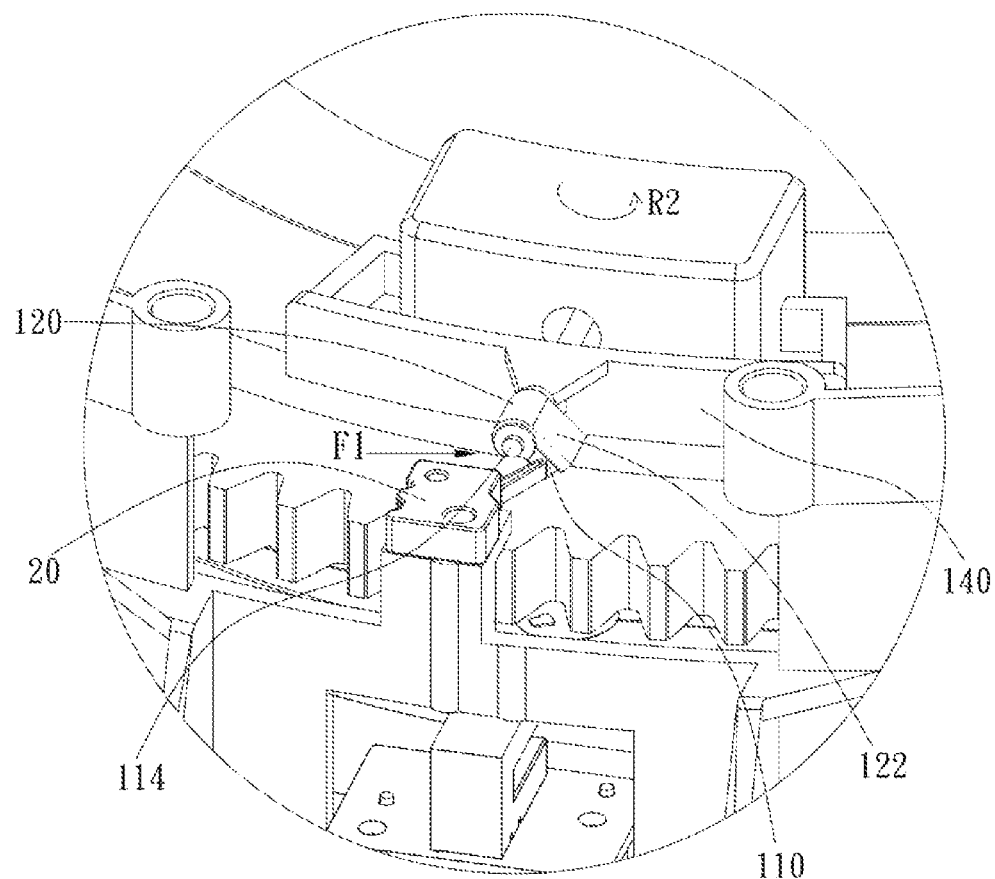
FIG. 6A is a schematic diagram showing that a positioning member of the rotary device of FIG. 6 passes through a limiting member.

Operation of the rotary device 1 is described below with reference to FIG. 6 and FIG. 7. As shown in FIG. 6, when the rotatable member 10 rotates along the first rotation direction R1 to make the limiting member 20 abut against the positioning member 120, the limiting member 20 makes the positioning member 120 rotate relative to the stopping portion 110, to allow the positioning member 120 to pass through the limiting member 20. Specifically, when the gear portion 132 in FIG. 1 rotates by 90 degrees along, for example, a clockwise direction (that is, the first rotation direction R1), the positioning mechanism 100 rotates with the gear portion 132, so that the positioning member 120 touches the limiting member 20, thereby generating an anticlockwise acting force F1 on the left side of the plate body portion 122 (that is, the limiting member 20 and the stopping portion 112 are located on the same side of the plate body portion 122). In this case, as shown in FIG. 6A, the stopping portion 112 is in front of a movement direction of the plate body portion 122 (that is, the protruding rib 128 protrudes toward the limiting member 20), so that the limiting member 20 pushes the positioning member 120 to move away from the stopping portion 112 and rotate relative to the stopping portion 112. To be specific, the plate body portion 122 rotates in an anticlockwise direction (that is, the first direction R2) relative to the rotating shaft 114 to rise up, so that the positioning member 120 passes through the limiting member 20, thereby allowing the rotatable member 10 to continue to move along a clockwise direction (that is, the first rotation direction R1). After the positioning member 120 passes through the limiting member 20, the plate body portion 122 that rises up may automatically rotate downward by using gravity of itself to reset the positioning member 120. In this state, the rotatable member 10 may perform rotation by an angle greater than 360 degrees in the first rotation direction R1. That is, the limiting member 20 has no limiting function for the rotatable member 10 in the first rotation direction R1.

As shown in FIG. 7, when the rotatable member 10 rotates along the second rotation direction R1' opposite to the first rotation direction R1 to make the limiting member 20 abut against the positioning member 120, the limiting member 20 stops the positioning member 120, so that the positioning member 120 is stopped between the limiting member 20 and the stopping portion 112, to position the rotatable member 10. Specifically, when the gear portion 132 in FIG. 1 rotates by 270 degrees along, for example, an anticlockwise direction (that is, the second rotation direction R1'), the positioning mechanism 100 rotates with the gear portion 132, so that the positioning member 120 touches the limiting member 20, thereby generating a clockwise acting force F2 on the right side of the plate body portion 122 (that is, the limiting member 20 and the stopping portion 112 are located on opposite sides of the plate body portion 122). In this case, the stopping portion 112 is behind the movement direction of the plate body portion 122 (that is, the protruding rib 128 protrudes opposite to the limiting member 20), so that the limiting member 20 pushes the positioning member 120 toward the stopping portion 112. To be specific, the positioning member 120 moves close to the stopping portion 112, so that the positioning member 120 is stopped between the stopping portion 112 and the limiting member 20 and cannot rotate relative to the rotating shaft 114, so that the rotatable member 10 cannot continue to rotate along the anticlockwise direction (that is, the second rotation direction R1'), so as to be positioned. In this state, the anticlockwise acting force applied to the limiting member 20 by the positioning member 120 may trigger the switching unit of the limiting member 20, thereby achieving one-way positioning (for example, anticlockwise positioning) of the rotary device 1. That is, when the rotatable member 10 rotates along the second rotation direction R1' opposite to the first rotation direction R1 to make the positioning member 120 stopped between the stopping portion 112 and the limiting member 20, the switching unit is triggered. It should be noted herein that according to actual application, a positioning angle of the rotary device 1 may be changed by adjusting a location of the positioning member 100 relative to the limiting member 20, and a positioning direction of the rotary device 1 may be changed by changing a location of the positioning member 120 relative to the stopping portion 112. For example, by changing the anticlockwise one-way rotation of the positioning member 120 relative to the stopping portion 112 in FIG. 4A into clockwise one-way rotation of the positioning member 120 relative to the stopping portion 112, the rotary device 1 may have, for example, clockwise one-way positioning.

Figure 8:
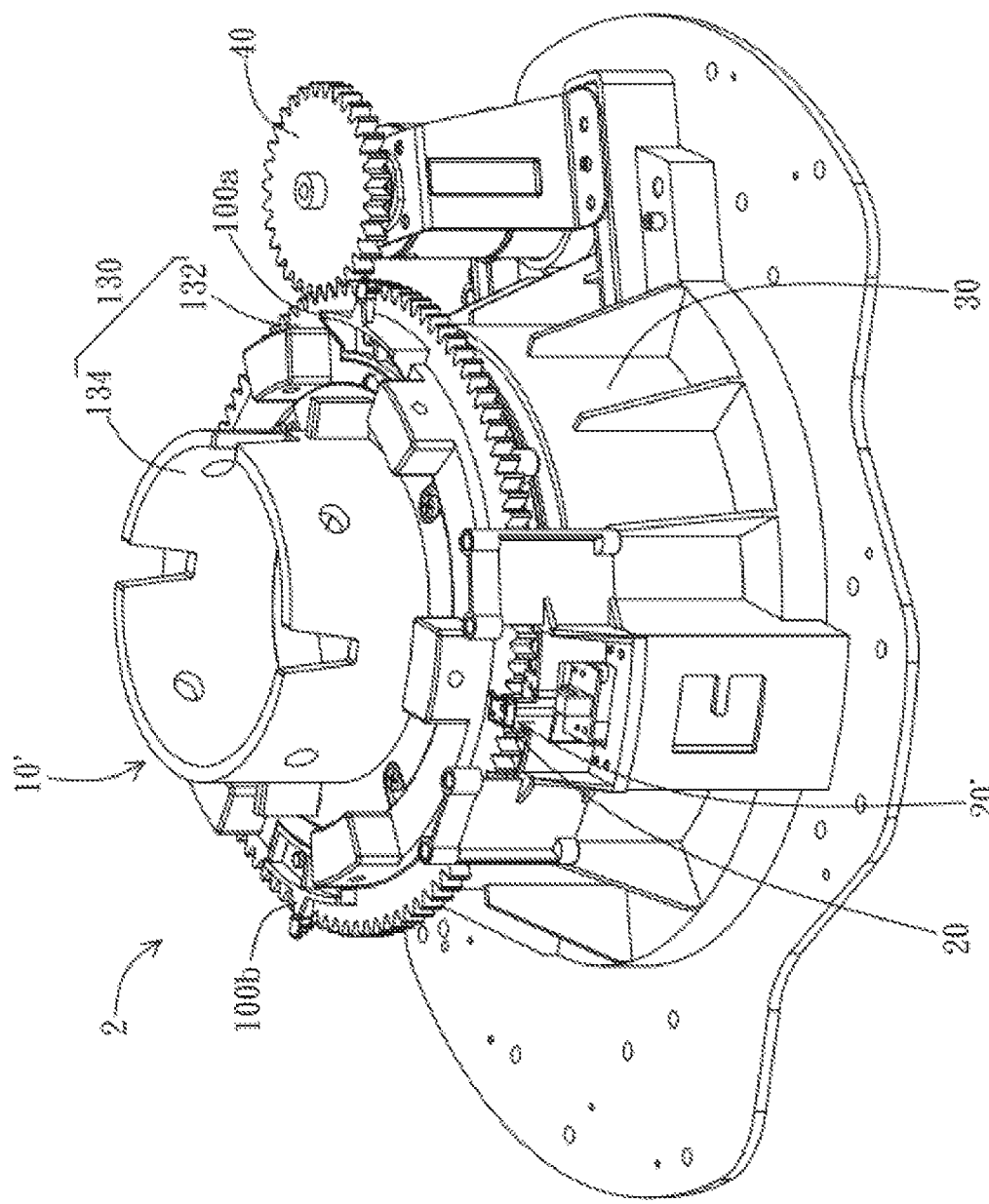
FIG. 8 is a schematic diagram of a rotary device according to another embodiment of the application.

Further, the rotary device of the application may achieve two-way positioning by means of cooperation between two positioning mechanisms and one or two limiting members. As shown in FIG. 8, in another embodiment, a rotary device 2 of the application includes a rotatable member 10' and a limiting mechanism 20'. The rotatable member 10' has two positioning mechanisms (for example, 100a and 100b). The limiting mechanism 20' may include a limiting member 20. Specifically, the rotatable member 10' includes a first positioning mechanism 100a and a second positioning mechanism 100b, and for structural details of the first positioning mechanism 100a and the second positioning mechanism 100b, refer to related descriptions of the positioning mechanism 100 of FIG. 4A. Configurations of the first positioning mechanism 100a and the second positioning mechanism 100b and two-way positioning operation of, for example, approximately ±270 degrees, of the rotary device 2 are focused for description below.

Figure 8A:
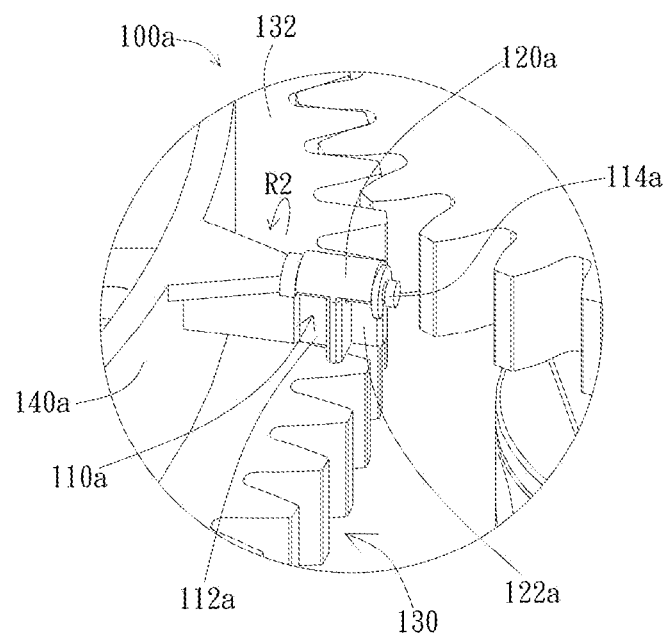
FIG. 8A and FIG. 8B are schematic diagrams of configuration of a positioning mechanism of FIG. 8.
Figure 8B:
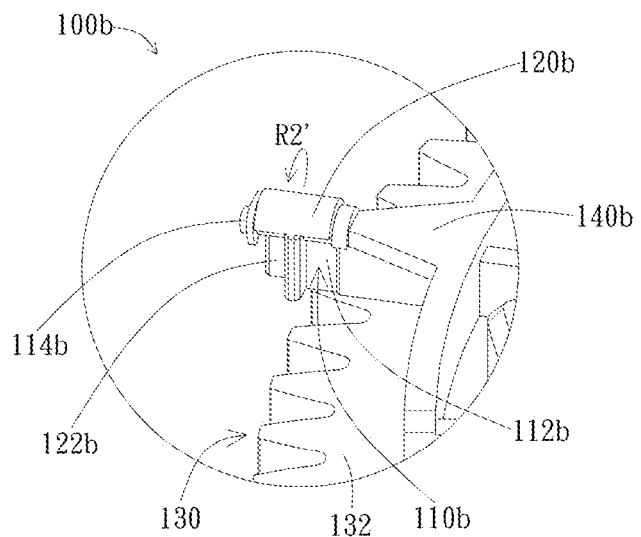

As shown in FIG. 8, the first positioning mechanism 100a and the second positioning mechanism 100b are preferably disposed on two opposite sides (locations with a 180-degree difference therebetween) of a rotation body 130, and are preferably located on a same plane, to be specific, horizontal projection locations on a shaft body portion 134 are the same (or heights relative to the base 30 are the same). In this embodiment, the limiting member 20 is preferably disposed between the first positioning mechanism 100a and the second positioning mechanism 100b (for example, the limiting member 20 is disposed at locations respectively having a 90-degree difference with the first positioning mechanism 100a and the second positioning mechanism 100b), to selectively stop the first positioning mechanism 100a or the second positioning mechanism 100b, to position the rotatable member 10'. In this embodiment, as shown in FIG. 8A, the first positioning mechanism 100a includes a first stopping member 110a and a first positioning member 120a, and the first positioning mechanism 100a may be connected to the rotation body 130 (or a gear portion 132) by using a first stopping member 110a and a supporting member 140a. In this embodiment, the first stopping member 110a includes a rotating shaft 114a and a first stopping portion 112a. Settings of the first positioning member 120a and the first stopping member 110a are the same as those of FIG. 4A. To be specific, the first positioning member 120a is rotatably sleeved over a rotating shaft 114a of the first stopping member 110a, and a part of the first stopping member 110a (that is, the first stopping portion 112a) is correspondingly disposed on one side of the first positioning member 120a. The first stopping portion 112a is in a clockwise direction (that is, a left side) of the first positioning member 120a, so that when an anticlockwise acting force acts on a first plate body portion 122a, the first plate body portion 122a may rotate in an anticlockwise direction (that is, a first direction R2) relative to the rotating shaft 114a (or the first stopping portion 112a). As shown in FIG. 8B, the second positioning mechanism 100b includes a second stopping member 110b and a second positioning member 120b, and the second positioning mechanism 100b may be connected to the rotation body 130 (or the gear portion 132) by using a second stopping member 110b and a supporting member 140b. In this embodiment, the second stopping member 110b includes a rotating shaft 114b and a second stopping portion 112b. Settings of the second positioning member 120b and the second stopping member 110b are opposite as those of FIG. 4A. To be specific, the second positioning member 120b is rotatably sleeved over a rotating shaft 114b of the second stopping member 110b, and a part of the second stopping member 110b (that is, the second stopping portion 112b) is correspondingly disposed on one side of the second positioning member 120b. The second stopping portion 112b is in an anticlockwise direction (that is, a right side) of the second positioning member 120b, so that when a clockwise acting force acts on a second plate body portion 122b, the second plate body portion 122b may rotate in a clockwise direction (that is, a second direction R2') relative to the rotating shaft 114b (or the second stopping portion 112b).

Figure 9A:
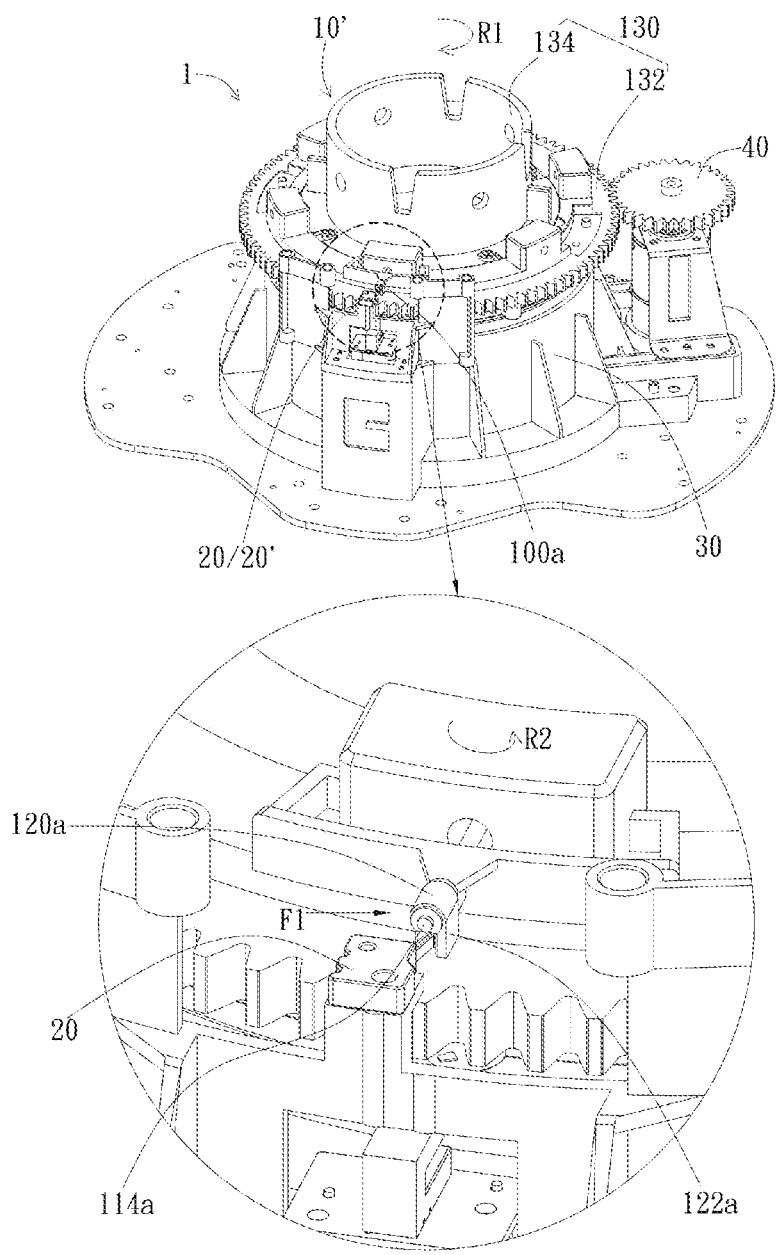
FIG. 9A is a schematic diagram of 90-degree rotation of a rotatable member of the rotary device of FIG. 8 along a first direction.
Figure 9B:
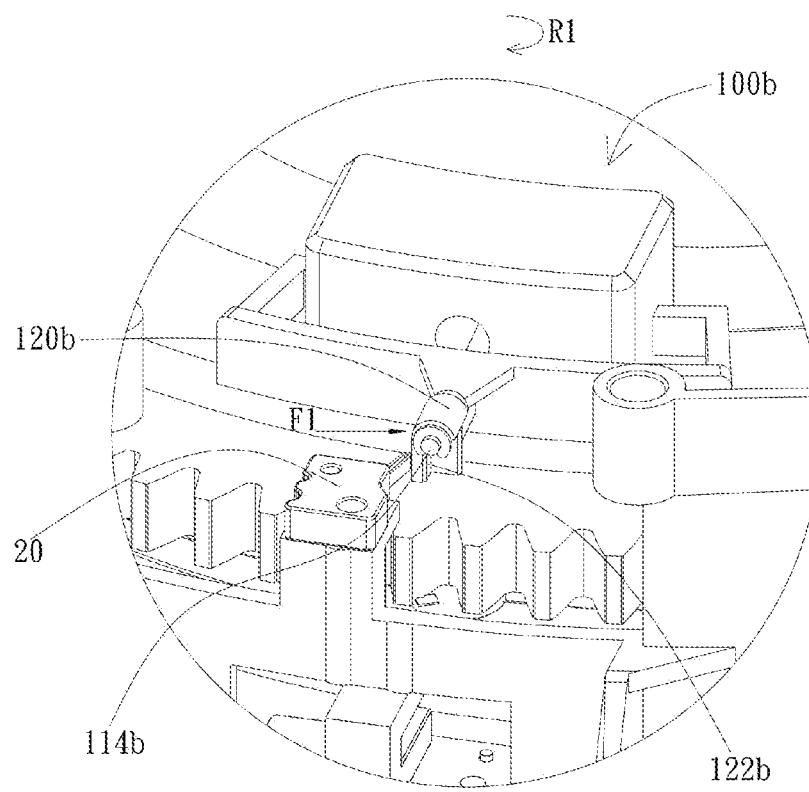
FIG. 9B is a schematic diagram of 270-degree rotation of the rotatable member of the rotary device of FIG. 8 along the first direction.

The limiting mechanism 20' is fixed on the base 30, and the limiting mechanism 20' is configured to selectively stop the first positioning member 120a or the second positioning member 120b according to a rotation direction of the rotatable member 10'. Two-way positioning operation of the rotary device 2 is described below with reference to FIG. 9A and FIG. 9B, and FIG. 10A and FIG. 10B. As shown in FIG. 9A and FIG. 9B, when the rotatable member 10' in FIG. 8 rotates along the first rotation direction R1, the limiting mechanism 20' allows the first positioning mechanism 100a to pass through and the second positioning member 120b is stopped between the limiting mechanism 20' and the second stopping portion 112b, to position the rotatable member 10'. Specifically, when the gear portion 132 of FIG. 8 rotates by 90 degrees along, for example, a clockwise direction (that is, the first rotation direction R1), the second positioning mechanism 100b rotates to a 180-degree direction of the limiting member 20, and similar to the embodiment of FIG. 6, the first positioning member 120a is pushed by the limiting mechanism 20' to move away from the first stopping portion 112a and rotate along the first direction R2 relative to the first stopping member 110a. Specifically, the first stopping portion 112a is in front of a movement direction of the first plate body portion 122a, so that the limiting member 20 generates an anticlockwise acting force F1 to push the first positioning member 120a to rotate relative to the first stopping portion 112a (for example, the first direction R2). To be specific, the first plate body portion 122a rotates in an anticlockwise direction relative to the first stopping portion 112a to rise up, so that the first positioning member 120a passes through the limiting member 20, thereby allowing the rotatable member 10' to continue to move along a clockwise direction (that is, the first rotation direction R1) until rotating by 270 degrees. As shown in FIG. 9B, when the gear portion 132 of FIG. 8 rotates by 270 degrees along, for example, a clockwise direction (that is, the first rotation direction R1), the first positioning mechanism 100a has passed through the limiting member 20 and rotated to a 180-degree direction of the limiting member 20, the second positioning member 120b of the second positioning mechanism 100b rotates to abut against the limiting member 20, and the second positioning member 120b is pushed by the limiting member 20 and moves close to the second stopping portion 112b. Specifically, the second positioning member 120b of the second positioning mechanism 100b touches the limiting member 20, thereby generating an anticlockwise acting force F1 on the second plate body portion 122b. In this case, the second stopping portion 112b is behind the movement direction of the second plate body portion 122b, so that the limiting member 20 pushes the second positioning member 120b toward the second stopping portion 112b, so that the second positioning member 120b is stopped between the limiting member 20 and the second stopping portion 112b and cannot rotate relative to the rotating shaft (or the second stopping portion 112b), so that the rotatable member 10' cannot continue to rotate along the clockwise direction (that is, the first rotation direction R1), to achieve approximately 270-degree clockwise positioning.

Figure 10A:
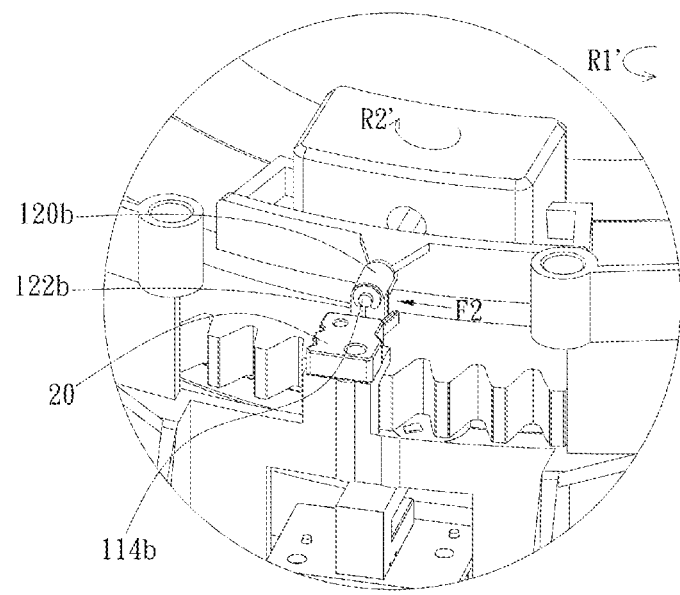
FIG. 10A is a schematic diagram of 90-degree rotation of the rotatable member of the rotary device of FIG. 8 along a second direction.
Figure 10B:
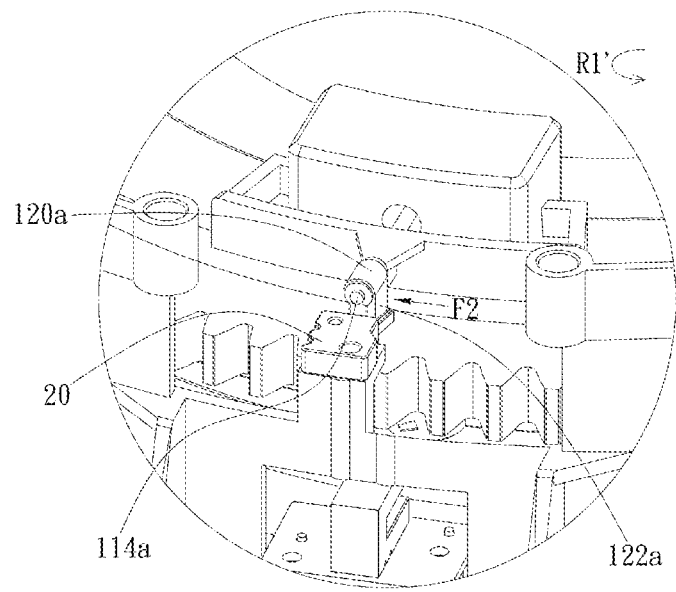
FIG. 10B is a schematic diagram of 270-degree rotation of the rotatable member of the rotary device of FIG. 8 along the second direction.

As shown in FIG. 10A and FIG. 10B, when the rotatable member 10' in FIG. 8 rotates along the second rotation direction R1', the limiting mechanism 20' allows the second positioning mechanism 100b to pass through and the first positioning member 120a is stopped between the limiting mechanism 20' and the first stopping portion 112a, to position the rotatable member 10'. Specifically, as shown in FIG. 10A, when the gear portion 132 of FIG. 8 rotates by 90 degrees along, for example, an anticlockwise direction (that is, the second rotation direction R1'), the first positioning mechanism 100a rotates to a 180-degree direction of the limiting member 20, and the second positioning member 120b is pushed by the limiting mechanism 20' to move away from the second stopping portion 112b and rotate along the second direction R2' relative to the second stopping member 110b. Specifically, the second stopping portion 112b is in front of a movement direction of the second plate body portion 122b, so that the limiting member 20 generates a clockwise acting force F2 to push the second positioning member 120b to rotate relative to the second stopping portion 112b (that is, the second direction R2'). To be specific, the second plate body portion 122b rotates in a clockwise direction relative to the second stopping portion 112b to rise up, so that the second positioning member 120b passes through the limiting member 20, thereby allowing the rotatable member 10' to continue to move along an anticlockwise direction (that is, the second rotation direction R1') until rotating by 270 degrees. As shown in FIG. 10B, when the gear portion 132 of FIG. 8 rotates by 270 degrees along, for example, an anticlockwise direction (that is, the second rotation direction R1'), the second positioning mechanism 100b has passed through the limiting member 20 and rotated to a 180-degree direction of the limiting member 20, and similar to FIG. 7, the first positioning member 120a rotates to abut against the limiting member 20, and the first positioning member 120a is pushed by the limiting member 20 and moves close to the first stopping portion 112a. Specifically, the first positioning member 120a of the first positioning mechanism 100a touches the limiting member 20, thereby generating a clockwise acting force F2 on the first plate body portion 122a. In this case, the first stopping portion 112a is behind the movement direction of the first plate body portion 122a, so that the limiting member 20 pushes the first positioning member 120a toward the first stopping portion 112a, so that the first positioning member 120a is stopped between the first stopping portion 112a and the limiting member 20 and cannot rotate relative to the rotating shaft (or the first stopping portion 112a), so that the rotatable member 10' cannot continue to rotate along the anticlockwise direction (that is, the second rotation direction R1'), to achieve approximately 270-degree anticlockwise positioning.

Figure 11:
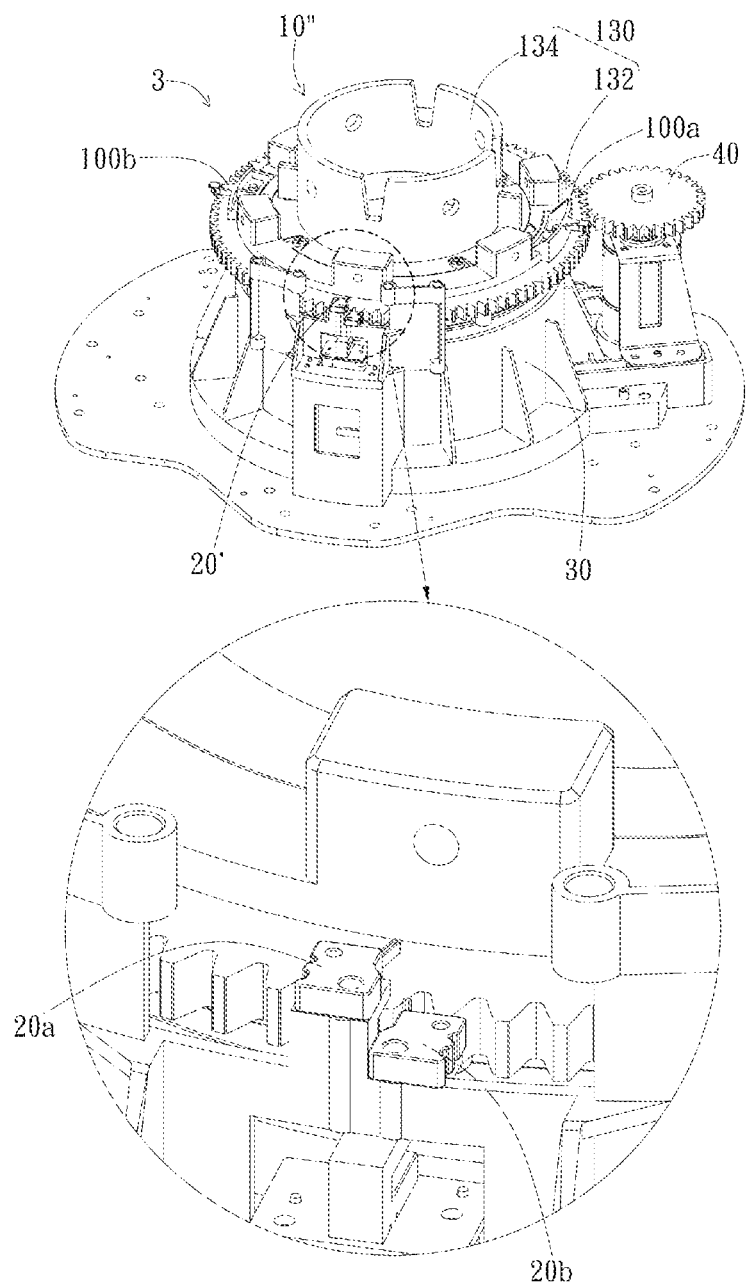
FIG. 11 is a schematic diagram of a rotary device according to another embodiment of the application.

Further, in another embodiment, as shown in FIG. 11, a rotary device 3 of the application includes a rotatable member 10" and a limiting mechanism 20'. The rotatable member 10" has two positioning mechanisms (for example, 100a and 100b). The limiting mechanism 20' includes two limiting members (for example, 20a and 20b). Differences between the rotatable member 10" and the limiting mechanism 20' and the foregoing embodiments and two-way positioning operation of, for example, approximately ±270 degrees, of the rotary device 3 are focused for description below. Specifically, the limiting mechanism 20' includes a first limiting member 20a and a second limiting member 20b, and a first positioning mechanism 100a and a second positioning mechanism 100b are disposed along an axial direction of a shaft body portion 134. The first limiting member 20a corresponds to the first positioning mechanism 100a, to stop the first positioning mechanism 100a and allow the second positioning mechanism 100b to pass through, and the second limiting member 20b corresponds to the second positioning mechanism 100b, to block the second positioning mechanism 100b and allow the first positioning mechanism 100a to pass through.

Specifically, in this embodiment, the first positioning mechanism 100a and the second positioning mechanism 100b are preferably disposed on two opposite sides (locations with a 180-degree difference therebetween) of a rotation body 130, and are preferably located on different horizontal planes, to be specific, horizontal projection locations on a shaft body portion 134 are different (or heights relative to the base 30 are different). Further, the first limiting member 20a and the second limiting member 20b are preferably disposed adjacent to each other, and are disposed respectively corresponding to the first positioning mechanism 100a and the second positioning mechanism 100b, so that horizontal projection locations of the first limiting member 20a and the second limiting member 20b on the shaft body portion 134 are also different. For example, the first limiting member 20a is disposed on a rotation path of the first positioning mechanism 100a, rather than a rotation path of the second positioning mechanism 100b, so that the second positioning member 120b preferably passes through from below of the first limiting member 20a without contacting the first limiting member 20a. Similarly, the second limiting member 20b is disposed on a rotation path of the second positioning mechanism 100b, rather than a rotation path of the first positioning mechanism 100a, so that the first positioning member 120a preferably passes through from above of the second limiting member 20b without contacting the second limiting member 20b.

Figure 12A:
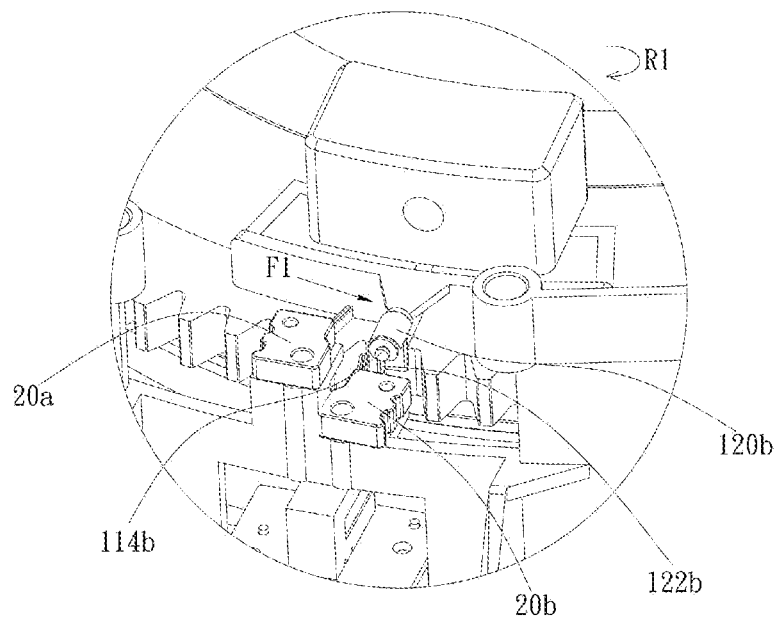
FIG. 12A is a schematic diagram of 270-degree rotation of a rotatable member of the rotary device of FIG. 11 along a first direction.

As shown in FIG. 12A, when the rotatable member 10" of FIG. 11 rotates by 270 degrees along, for example, a clockwise direction (that is, a first rotation direction R1), the first positioning mechanism 100a passes through the first limiting member 20a in a manner similar to that described above and rotates to a 180-degree direction of the first limiting member 20a, and the second positioning member 120b of the second positioning mechanism 100b touches the second limiting member 20b, thereby generating an anticlockwise acting force on the second plate body portion 122b, so that the second limiting member 20b pushes the second positioning member 120b toward the second stopping portion 112b, and the second positioning member 120b is stopped between the second limiting member 20b and the second stopping portion 112b, thereby achieving positioning of approximately 270-degree clockwise rotation of the rotary device 3.

Figure 12B:
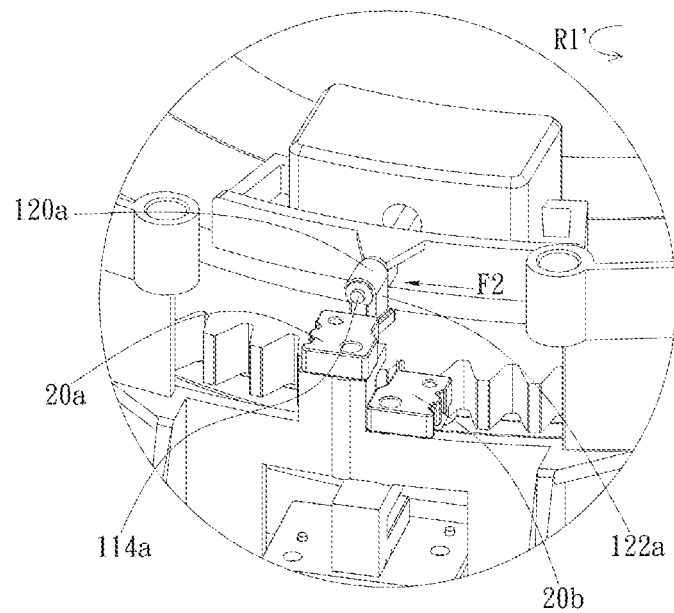
FIG. 12B is a schematic diagram of 270-degree rotation of the rotatable member of the rotary device of FIG. 11 along a second direction.

As shown in FIG. 12B, when the rotatable member 10" of FIG. 11 rotates by 270 degrees along, for example, an anticlockwise direction (that is, a second rotation direction R2), the second positioning mechanism 100b passes through the second limiting member 20b in a manner similar to that described above and rotates to a 180-degree direction of the second limiting member 20b, and the first positioning member 120a of the first positioning mechanism 100a touches the first limiting member 20a, thereby generating a clockwise acting force on the first plate body portion 122a, so that the first limiting member 20a pushes the first positioning member 120a toward the first stopping portion 112a, and the first positioning member 120a is stopped between the first limiting member 20a and the first stopping portion 112a, thereby achieving positioning of approximately 270-degree anticlockwise rotation of the rotary device 3.

It should be noted herein that, similar to the embodiment of FIG. 1, the first limiting member 20a may include a first switching unit (not shown), and the second limiting member 20b may include a second switching unit (not shown). Therefore, when the rotatable member 10" rotates along the second rotation direction R1' to make the first limiting member 20a abut against the first positioning member 120a, and make the first positioning member 120a stopped between the first stopping portion 112a and the limiting member 20, the first switching unit is triggered; when the rotatable member 10" rotates along the first rotation direction R1 to make the second limiting member 20b abut against the second positioning member 120b, and make the second positioning member 120b stopped between the limiting member 20 and the second stopping portion 112b, the second switching unit is triggered.

Figure 13A:
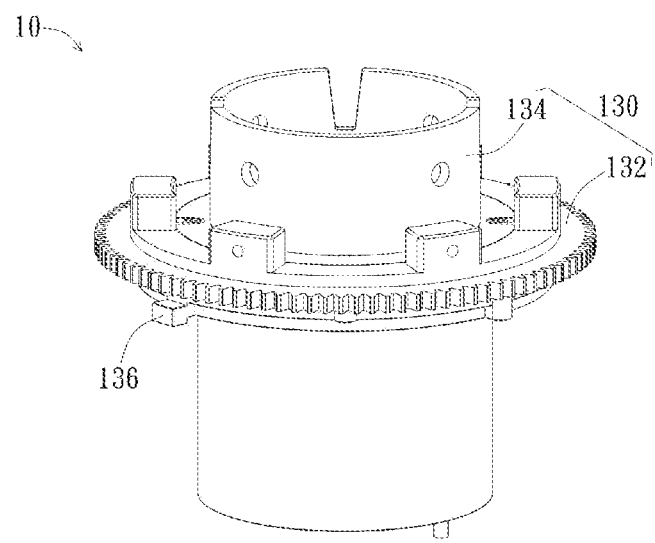
FIG. 13A to FIG. 13C are respectively partial exploded, side, and assembly schematic diagrams of a rotary device according to another embodiment of the application.
Figure 13A:
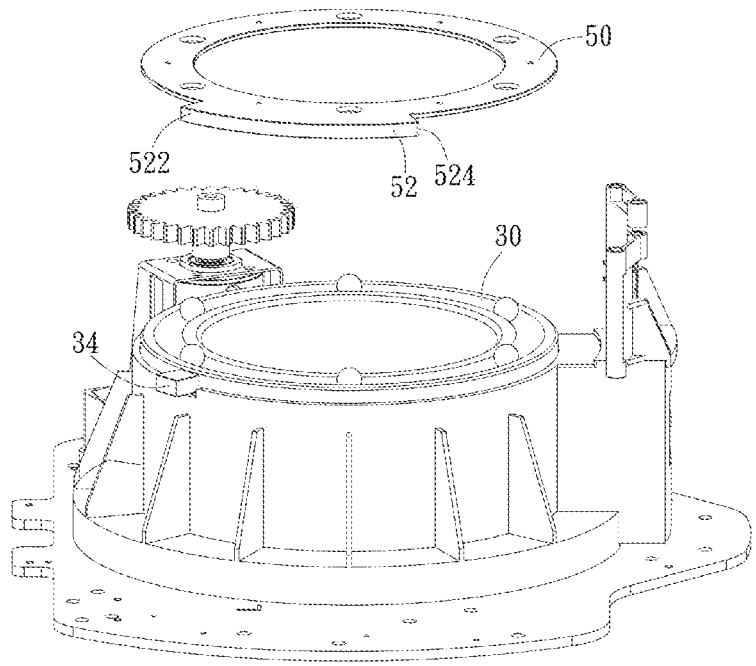
Figure 13B:
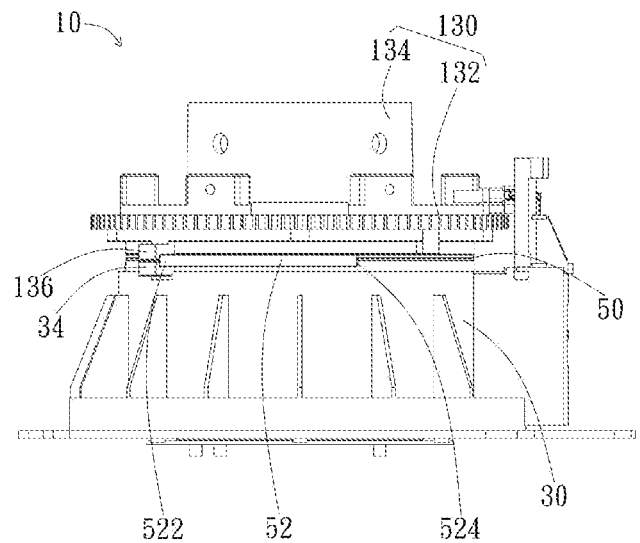
Figure 13C:
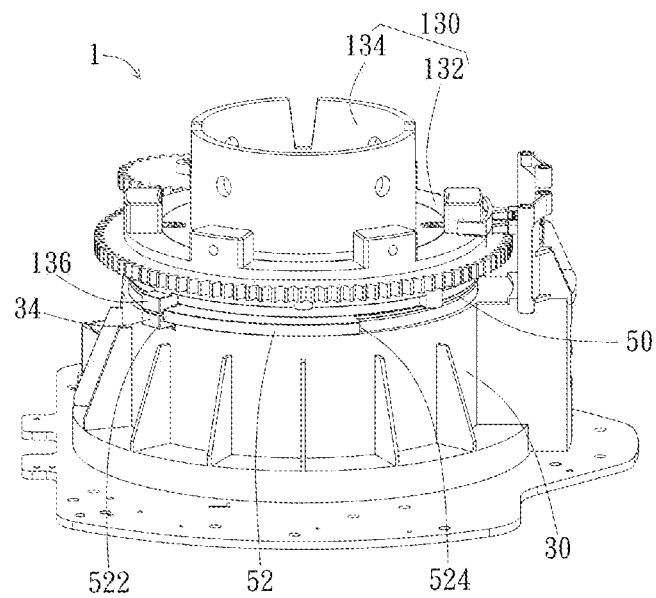

In addition, for the rotary device 1, 2, or 3 of the application, positioning of the rotary device may be further limited by using a movable ring and a blocking member. Descriptions are provided below by using the rotary device 1 as an example. The rotary device 2 or 3 may have a similar structure. As shown in FIG. 13A to FIG. 13C, the rotary device 1 may further include a movable ring 50 and a blocking member 34. The movable ring 50 and the blocking member 34 are disposed coaxial with the rotatable member 10. The rotatable member 10 is connected to the movable ring 50 and drives the movable ring 50 to rotate. The blocking member 34 is fixed on the base 30 and is located on a rotation path of the movable ring 50. When the movable ring 50 rotates along the rotation path and abuts against the blocking member 34, the blocking member 34 is configured to block the movable ring 50, to position the rotatable member 10. Further, the rotatable member 10 has a protruding portion 136. The positioning mechanism 100 and the protruding portion 136 are disposed along an axial direction of the shaft body portion 134 and are located on a periphery of the shaft body portion 134. That is, heights of the positioning mechanism 100 and the protruding portion 136 relative to the base 30 are different. The movable ring 50 has a convex block 52, and the convex block 52 is disposed in a protruding manner along a part of a circumference of the movable ring 50. When the rotatable member 10 rotates, the protruding portion 136 pushes the convex block 52 of the movable ring 50, so that the movable ring 50 rotates along the rotation path, until the protruding portion 136 and the blocking member 34 respectively abut against two opposite ends of the convex block 52 (for example, a first end 522 and a second end 524).

Specifically, the movable ring 50 is preferably in a shape of a flat ring, and the movable ring 50 is rotatably sleeved over the shaft body portion 134, and is located between the rotatable member 10 and the base 30. In an embodiment, the convex block 52 of the movable ring 50 may be an arc-shaped convex block that radially protrudes and extends downward and that is concentric with the movable ring 50, and an arc of the convex block 52 extending along the movable ring 50 has a corresponding preset central angle. In other words, the convex block 52 has the first end 522 and the second end 524, and an angle between the first end 522 and the second end 524 and a circle center is a central angle. By using approximately ±270-degree two-way positioning as an example, a central angle corresponding to the convex block 52 is preferably 90 degrees, but the application is not limited thereto. The central angle corresponding to the convex block 52 may vary according to a positioning angle. In this embodiment, the blocking member 34 is preferably a baffle block disposed on the base 30, to correspond to the convex block 52 of the movable ring 50, and the protruding portion 136 may be a block protruding from below of the gear portion 132. In an embodiment, locations of the protruding portion 136, the convex block 52 of the movable ring 50, and the blocking member 34 are preferably located on a circumference of a same circle, and a thickness of the convex block 52 of the movable ring 50 in the axial direction preferably partially overlaps the protruding portion 136 and the blocking member 34.

When the rotatable member 10 rotates (for example, rotates in an anticlockwise direction), the protruding portion 136 of the rotatable member 10 pushes the first end 522 of the convex block 52 of the movable ring 50, thereby driving the movable ring 50 to move. When the rotatable member 10 rotates by approximately 270 degrees in the anticlockwise direction, the protruding portion 136 of the rotatable member 10 pushes the first end 522 of the convex block 52, and makes the second end 524 of the convex block 52 abut against the blocking member 34, thereby limiting anticlockwise rotation of the rotatable member 10. When power applied to the rotatable member 10 is excessively large and consequently, a limiting mechanism of the limiting member 20 and the positioning mechanism 100 fails, a security mechanism that prevents burst of the rotatable member 10 may be provided by disposing the movable ring 50 and the blocking member 34.

In addition, when the rotatable member 10 rotates in a clockwise direction, the protruding portion 136 of the rotatable member 10 is located on the first end 522 of the convex block 52 of the movable ring 50 and does not drive the movable ring 50 to move. When the rotatable member 10 rotates by approximately 270 degrees in the clockwise direction, the protruding portion 136 of the rotatable member 10 pushes the second end 524 of the convex block 52, and makes the first end 522 of the convex block 52 abut against the blocking member 34, thereby limiting clockwise rotation of the rotatable member 10, and achieving positioning in the clockwise direction of the rotatable member 10. In other words, in the embodiment of FIG. 13A to FIG. 13C, the rotary device 3 can also achieve approximately 270-degree clockwise positioning by disposing the movable ring 50.

Based on the above, according to the rotary device of the application, in cooperation with the positioning member and the stopping portion of the positioning mechanism, the limiting member provides a selective stopping function according to different rotation directions of the rotatable member, so that one-way positioning can be effectively achieved, and reverse free rotation can be achieved. Further, by using the limiting mechanism in cooperation with two one-way positioning mechanisms, the rotary device of the application not only can provide a selective stopping function according to different rotation directions of the rotatable member, but also can effectively achieve two-way positioning of greater than 180 degrees.

The application is described through the foregoing embodiments. However, the foregoing embodiments are intended for an exemplary objective only, rather than a limitative objective. A person skilled in the art should know that other modifications of exemplified embodiments may be made to embodiments specifically described herein without departing from the spirit of the application. Therefore, the scope of the application also covers such modifications and is limited only to the appended claims.

What is claimed is:

1. A rotary device, comprising:
  a rotatable member, rotatably disposed on a base, wherein the rotatable member comprises a positioning mechanism, the positioning mechanism comprises a stopping member and a positioning member, the stopping member comprises a rotating shaft and a stopping portion, the stopping portion is protruded from the rotating shaft, the positioning member is rotatably sleeved over the rotating shaft, and one side of the positioning member corresponds to the stopping portion; and
  a limiting member, fixed on the base, wherein the limiting member is configured to selectively stop the positioning member according to a rotation direction of the rotatable member, wherein
  when the rotatable member rotates along a first rotation direction to make the limiting member abut against the positioning member, the positioning member is pushed by the limiting member to move away from the stopping portion and rotate relative to the stopping member, so that the positioning member passes through the limiting member; when the rotatable member rotates along a second rotation direction opposite to the first rotation direction to make the limiting member abut against the positioning member, the positioning member is pushed by the limiting member to move close to the stopping portion, so that the positioning member is stopped between the limiting member and the stopping portion, to position the rotatable member.

2. The rotary device according to claim 1, wherein the rotatable member comprises a rotation body, the positioning mechanism further comprises a supporting member, the supporting member is disposed on the rotation body and is connected to the stopping member, and the rotating shaft extends along a radial direction of the rotation body and is protruded from the supporting member.

3. The rotary device according to claim 2, wherein the positioning member comprises a plate body portion and a shaft hole portion, the plate body portion is protruded from the shaft hole portion, the shaft hole portion is sleeved over the rotating shaft, and a part of the plate body portion corresponds to the stopping portion.

4. The rotary device according to claim 3, wherein the positioning member further comprises a protruding rib, the protruding rib is disposed on the plate body portion, and the protruding rib is configured to separate an area corresponding to the stopping portion of the plate body portion from an area that does not correspond to the stopping portion of the plate body portion.

5. The rotary device according to claim 1, further comprising a movable ring and a blocking member, wherein the movable ring and the blocking member are disposed coaxial with the rotatable member, the rotatable member is connected to the movable ring and drives the movable ring to rotate, the blocking member is fixed on the base and is located on a rotation path of the movable ring, and when the movable ring rotates along the rotation path and abuts against the blocking member, the blocking member is configured to block the movable ring, to position the rotatable member.

6. The rotary device according to claim 5, wherein the rotatable member further comprises a shaft body portion and a protruding portion, the positioning mechanism and the protruding portion are disposed on a periphery of the shaft body portion, and the protruding portion is located on the rotation path of the movable ring; the movable ring comprises a convex block, the convex block is protruded from a part of a circumference of the movable ring; and when the rotatable member rotates, the protruding portion pushes the convex block of the movable ring, so that the movable ring rotates along the rotation path, until the protruding portion and the blocking member respectively abut against two opposite ends of the convex block.

7. The rotary device according to claim 1, wherein the limiting member comprises a switching unit, when the rotatable member rotates along the second rotation direction opposite to the first rotation direction to make the limiting member abut against the positioning member, the switching unit is triggered.

8. A rotary device, comprising:
a rotatable member, rotatably disposed on a base, wherein the rotatable member comprises a first positioning mechanism and a second positioning mechanism, the first positioning mechanism comprises a first stopping member and a first positioning member, the second positioning mechanism comprises a second stopping member and a second positioning member, each of the first stopping member and the second stopping member comprises a rotating shaft and a stopping portion, the stopping portion is protruded from the rotating shaft, the first positioning member and the second positioning member are respectively rotatably sleeved over the rotating shafts, and the stopping portions are separately correspondingly disposed on one side of the first positioning member and the second positioning member; and
a limiting mechanism, fixed on the base, wherein the limiting mechanism is configured to selectively stop the first positioning member or the second positioning member according to a rotation direction of the rotatable member, wherein
when the rotatable member rotates along a first rotation direction, the limiting mechanism allows the first positioning mechanism to pass through and the second positioning member is stopped between the limiting mechanism and the stopping portion of the second stopping member, to position the rotatable member; and when the rotatable member rotates along a second rotation direction opposite to the first rotation direction, the limiting mechanism allows the second positioning mechanism to pass through and the first positioning member is stopped between the limiting mechanism and the stopping portion of the first stopping member, to position the rotatable member.

9. The rotary device according to claim 8, wherein the first positioning member is rotatably sleeved over the rotating shaft of the first stopping member, the stopping portion of the first stopping member is correspondingly disposed on the side of the first positioning member, and when the rotatable member rotates along the first rotation direction, the limiting mechanism allows the first positioning mechanism to pass through, so that the first positioning member is pushed by the limiting mechanism to move away from the stopping portion of the first stopping member and rotate along a first direction relative to the first stopping member, so that the first positioning member passes through the limiting mechanism; and the second positioning member is rotatably sleeved over the rotating shaft of the second stopping member, the stopping portion of the second stopping member is correspondingly disposed on the side of the second positioning member, when the rotatable member rotates along the second rotation direction, the limiting mechanism allows the second positioning mechanism to pass through, so that the second positioning member is pushed by the limiting mechanism to move away from the stopping portion of the second stopping member and rotate along a second direction relative to the second stopping member, and the first direction is opposite to the second direction.

10. The rotary device according to claim 8, wherein the limiting mechanism comprises a first limiting member and a second limiting member, the rotatable member further comprises a shaft body portion; the first positioning mechanism and the second positioning mechanism are disposed along an axial direction of the shaft body portion; and the first limiting member corresponds to the first positioning mechanism, to stop the first positioning mechanism and allow the second positioning mechanism to pass through, and the second limiting member corresponds to the second positioning mechanism, to stop the second positioning mechanism and allow the first positioning mechanism to pass through.

11. The rotary device according to claim 10, wherein the first limiting member comprises a first switching unit, and the second limiting member comprises a second switching unit; when the rotatable member rotates along the second rotation direction to make the first limiting member abut against the first positioning member, the first switching unit is triggered; and when the rotatable member rotates along the first rotation direction to make the second limiting member abut against the second positioning member, the second switching unit is triggered.

12. The rotary device according to claim 8, further comprising a driving gear, wherein the driving gear receives a power to rotate, the rotatable member comprises a gear portion, the gear portion is engaged with the driving gear, and the driving gear drives the rotatable member to rotate.

13. The rotary device according to claim 12, wherein each of the first positioning mechanism and the second positioning mechanism further comprises a supporting member, the supporting members are disposed on the gear portion and are respectively connected to the first stopping member and the second stopping member, and the rotating shafts are respectively protruded from the supporting members.

14. The rotary device according to claim 13, wherein each of the first positioning member and the second positioning member comprises a plate body portion and a shaft hole portion, the plate body portion is protruded from the shaft hole portion, a part of the plate body portion corresponds to the corresponding stopping portion, and the shaft hole portion is sleeved over the corresponding rotating shaft.

15. The rotary device according to claim 14, wherein at least one of the first positioning member and the second positioning member further comprises a protruding rib, the protruding rib is disposed on the plate body portion, and the protruding rib is configured to separate an area corresponding to the first stopping portion or the second stopping portion of the plate body portion from an area that does not correspond to the first stopping portion or the second stopping portion of the plate body portion.

16. The rotary device according to claim 8, further comprising a movable ring and a blocking member, wherein the movable ring and the blocking member are disposed coaxial with the rotatable member, the rotatable member is connected to the movable ring and drives the movable ring to rotate, the blocking member is fixed on the base and is located on a rotation path of the movable ring, and when the movable ring rotates along the rotation path and abuts against the blocking member, the blocking member is configured to block the movable ring, to position the rotatable member.

17. The rotary device according to claim 16, wherein the movable ring has a convex block, the convex block is disposed in a protruding manner along a part of a circumference of the movable ring, and when the rotatable member rotates, the protruding portion pushes the convex block of the movable ring, so that the movable ring rotates along the rotation path, until the protruding portion and the blocking member respectively abut against two opposite ends of the convex block.

* * * * *